INVENTORS
JOHN H. THOMAS & ALFRED MARZOCCHI

BY

ATTORNEYS

INVENTORS
JOHN H. THOMAS & ALFRED MARZOCCHI
ATTORNEYS

July 17, 1962 J. H. THOMAS ETAL 3,044,146
COMPOSITE FIBROUS GLASS BODIES
Filed Oct. 27, 1958 3 Sheets-Sheet 3

INVENTORS
JOHN H. THOMAS & ALFRED MARZOCCHI
BY
ATTORNEYS

United States Patent Office 3,044,146
Patented July 17, 1962

3,044,146
COMPOSITE FIBROUS GLASS BODIES
John H. Thomas, Darien, Conn., and Alfred Marzocchi, Manville, R.I., assignors to Owens-Corning Fiberglas Corporation, Toledo, Ohio, a corporation of Delaware
Filed Oct. 27, 1958, Ser. No. 769,847
5 Claims. (Cl. 28—78)

This invention relates to fibrous glass bodies for combining with, and structurally improving molded plastics, and pertains particularly to such fibrous glass reinforcements in composite sheet or mat form.

There have been three main types of strengthening elements of glass fibers utilized in the plastic molding and laminating fields. These different elements are usually created from strand assemblies of two hundred or more mechanically drawn, continuous glass filaments.

Where high production of articles of intricate shape is involved low cost preforms of bonded fibrous glass are extensively utilized. As suggested by their name, preforms are blanks roughly shaped and prepared before the main molding step for expeditious and successive placement in the forming mold; the latter is normally of matched metal die design. The preforms are ordinarily constructed by gathering decimated strands of fibrous glass, cut in short lengths of one half to two inches, upon an appropriately shaped screen.

The collection of cut strands is integrated in the developed arrangement by the setting of a binder introduced among the pieces of stand during the gathering thereof or applied over the assembled mass. Air flow through the screen is adjusted to attract more or less of the glass fibers to different areas of the screen according to the build-up best suited to the sectional configuration of the finishing mold.

Cut or chopped strands, such as used in the preform process, are also incorporated with resins in pre-mixed molding compounds which are poured or injected into the mold cavities.

A second common glass reinforcement is non-woven matting. A mat of this type is customarily made by collecting a layer of randomly positioned chopped strands upon a moving surface and cohering the layer into an integrated web by applying a binder or by a needling operation. In an alternate mat structure swirled continuous strands are substituted for the cut strand material. These mats run in weight between three quarter to ten ounces per square foot and all have about the same strengthening capacity, relative to weight.

Because of the comparative simplicity of their fabrication, mats are inexpensive and are preferred where cost is an important factor. They are positioned by hand within molds and may be arranged in a strata formation with woven glass fabrics. For any but the most plain or shallow conformations, mats are cut by hand or by machine driven scissors to exact shapes to fit the mold or certain portions thereof. Mats may be used for simple shapes in matched die molding but are more commonly employed in bag and hand lay-up molding methods.

Besides their economic advantage, mats have the attributes of good wettability for impregnation by the plastic resins, quick air releasing capacity, and superior surface characteristics. They also serve well as spacing and core material. Balancing these favorable qualities are their lower mechanical strength and non-uniformity. They have a strong inclination to break up and deteriorate under tailoring and molding stresses. This not only greatly reduces their reinforcing effectiveness, but also by permitting by-passing of the plastic acts to establish unsupported zones where the plastic resin content is concentrated.

When too heavily laden with a binder or when carrying a binder slow in dissolving, mats may be too springy to assume the mold contours. Because of their low coherence with an impregnation of a workable amount of binder or when binder-free as when needled, mats may not be pulled to shape over male molds having much curvature. Due to this tensile weakness they are not sufficiently self-sustaining for use in continuous laminating processes where the fabric is drawn through an impregnating resin supply. In view of their deficiency in uniform thickness, mats are also not well adapted to the exactness required in placing reinforcing sheets in vacuum injection molding processes.

The third type of fibrous glass reinforcement of high utilization are woven fabrics. These are produced in square, satin and unidirectional weaves, from yarn or rovings prepared by plying and twisting glass strands. The weights of these fabrics range usually between one quarter to one and one half ounces per square foot. While more expensive than mats, these fabrics are distinctly superior from a strength standpoint. They are not only self-sustaining during the molding procedure but provide more effective reinforcement in the plastic products. Their reinforcing pattern is more uniform and may be set directionally as desired by selection of weaves and the positioning of the fabrics.

The better performance of the woven fabrics as compared to that of the mats is derived from the continuous form of the yarns or roving, the interlocking of the weave, and the orientation of the yarn elements in generally straight paths across the fabric.

While both the unwoven mats and the woven fabrics of glass fibers have reinforcing capabilities which add tremendously to the physical properties of molded plastics, it may be noted that they differ in their strengthening effect and otherwise, possess rather contrasting characteristics.

It is the prime object of this invention to provide composite fibrous glass reinforcing elements which combine structural features and desirable attributes of these two types of fibrous glass sheet material, while eliminating or mitigating weaknesses thereof.

More specifically, an object of this invention is to provide a low cost fibrous glass reinforcing mat or sheet which utilizes a limited quantity of continuous glass strand or yarn to maintain major components of weakly bonded fibrous glass material in evenly distributed more integrated form.

A further object is the provision of a multilayer sheet reinforcement which may be employed in the molding of deep and complex pieces.

Another object of the invention is to provide a reinforcing mat requiring less tailoring.

A still further object is the provision of a composite reinforcing sheet which incorporates in a single unit fibrous glass elements which have in the past been separately handled and placed in molds.

The principal means by which the purposes of this invention are accomplished includes the tying together of unwoven fibrous bodies by strong, continuous strands of glass fibers. These strands are arranged in particular courses running across the major planar surfaces of the bodies and are interconnected through the bodies at regular, spaced intervals.

Supplemental and additional objects, as well as further benefits and a detailed explanation of the invention will be presented in the subsequent description with reference made to the accompanying drawings in which.

Figure 1:
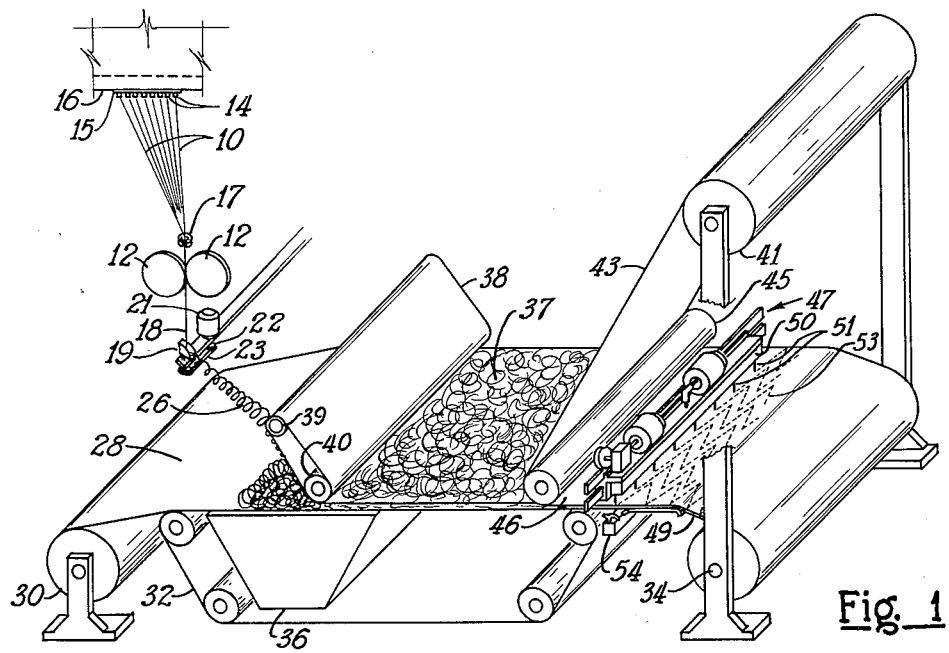
FIGURE 1 is a respective view of apparatus, shown rather schematically, by which composite reinforcing sheets embodying this invention may be produced.

Referring to the drawings in more detail, FIGURE 1 shows apparatus for making a particular composite mat or sheet in accordance with this invention. As there illustrated, glass filaments 10 are drawn by pulling wheels 12 from the multiple tips 14 in bushing 15 of a molten glass tank 16.

The filaments 10, usually in a quantity of two hundred, are gathered into strand form by a shoe 17. The resulting strand 18 is projected at high velocity by the wheels 12 against the deflector plate 19 which is constantly oscillated by mechanism including motor 21, crank 22 and connecting rod 23.

Through the force and angle of impingement against plate 19, the strand 18 is caused to take a helical configuration depicted at 26, and with the oscillating motion of plate 19 is directed back and forth upon the surface of advancing web 28. The speed of the latter is controlled to permit overlapping of the cross runs of the circling strand to an extent which will result in the desired thickness in the deposited strand. Intermittent jets of air may be used instead of the oscillating plate 19 to whirl an advancing strand and lay it in rows in a similar curled formation.

The web 28 is preferably a porous mat of cut strands held together by a light impregnation of a suitable binder not exceeding two percent by weight. The bonded web 28 arrives from supply roll 30 and is carried across belt conveyor 32 to be wound on the power-driven spindle 34. Air drawn through web 28 and foraminous conveyor 32 into the suction box 36 facilitates the even depositing of the curled strand upon the web. The smoothing of the accumulated layer 37 of strand is effected by the slight thrust thereagainst by belt 38 traveling between rollers 39 and 40.

From a supply roll 41 an upper web 43 of matted cut strands is drawn down around roller 45 and laid over the layer 37 of curled strand. The loose three ply lamination 46 comprising the lower web 28, layer 37 of curled strand, and upper web 43 is then directed through the stitching mechanism 47 by which endless lengths of fiber glass strand, rovings or yarn are sewed preferably in a lock stitch through the lamination 46 binding the loose sections together into a composite sheet 49.

The mechanism 47 includes a reciprocating bar 50 carrying eight needle stations 51. The back and forth movement of the bar together with the forward travel of the web assembly 46 results in zig-zag stitching patterns 53. Below the web is a multiple bobbin and shuttle assembly 54 of conventional design working in association with mechanism 47 in forming the two-threaded lock stitch.

In order that the strand, roving or yarn that is used for the stitching operation be sufficiently strong for over all purposes and be flexibel enough for the sharp turns required in stitching, the basic filaments should preferably have a diameter of twenty hundred thousandths of an inch or less and there should be at least four hundred filaments in each strand, roving or yarn. Accordingly, a single strand should have no less than four hundred filaments but when plied with one or more other strands in a roving or yarn may have the more standard count of two hundred basic filaments.

The composite reinforcing sheet material 49 created by the apparatus of FIGURE 1 has qualities surpassing those of conventional reinforcing elements of fibrous glass. The sturdy stitching thereof solidly integrates the several diverse layers into a unit which better withstands the strains of tailoring and the fitting to mold shapes.

Under molding operation the flow of the plastic is facilitated by the porosity of the unwoven glass media. The uniform distribution of the fibrous glass is improved by the joint use of the two outer mats, by which unevenness in one may be somewhat counter balanced by a non-matching spread of the cut strands in the other. The whirled continuous strand of the center layer, besides being inherently more effective than chopped pieces, has a natural uniform arrangement which contributes to the desirable characteristic of uniformity in the composite sheet. The stitching strands not only hold the composite sheet against deterioration under the duress of molding pressures thereby preserving its full strengthening capacity, but also independently increase the strength of the resulting molded product.

Figure 2:
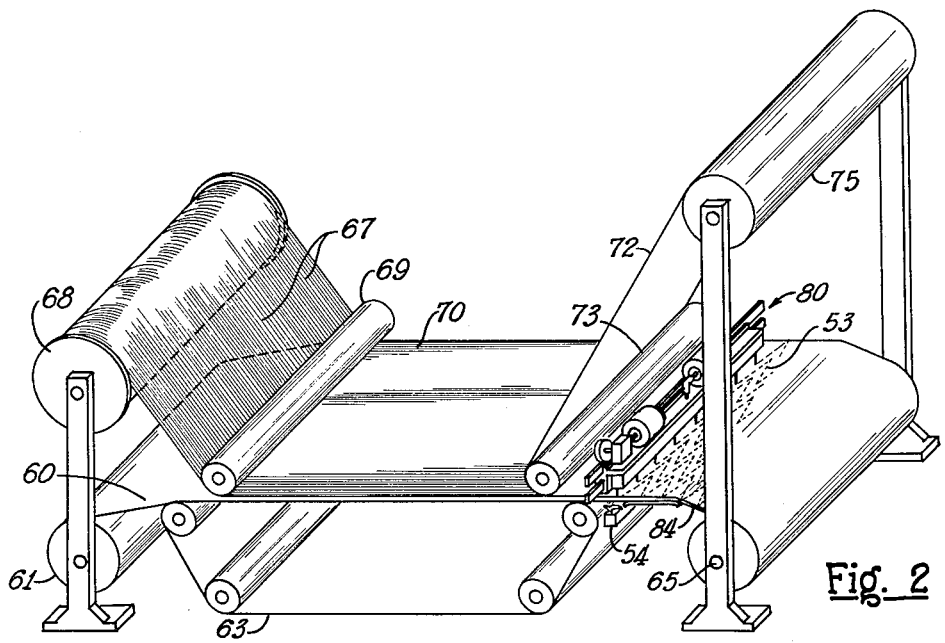
FIGURE 2 is a like view of different apparatus for creating another form of reinforcing sheets coming within the scope of the invention.

In the apparatus shown in FIGURE 2, a web 60 of a bonded mat is delivered from a supply roll 61, carried across belt conveyor 63 and wound on the collecting spindle 65. A closely arrayed series of fibrous glass strands 67 are drawn from the spool or beam 68 and laid upon web 60 by roller 69. Over the layer 70 of parallel strands 67 a top web 72 of bonded mat is imposed by roller 73, which draws this web from the supply drum 75.

A stitching mechanism 80 similar to mechanism 47 of the apparatus of FIGURE 1 is here utilized with the lower bobbin carrier 54 to bind the mat webs 60 and 72 with the intermediate strand stratum 70 into the multi-layer, composite sheet 84. This composite sheet fabricated by the apparatus of FIGURE 2 not only has the improved qualities of dimensional integrity and sturdiness of the sheet formed by the apparatus of FIGURE 1 but is highly useful in providing great uni-directional strength in the longitudinal direction in which the center continuous strands extend.

Figure 3:
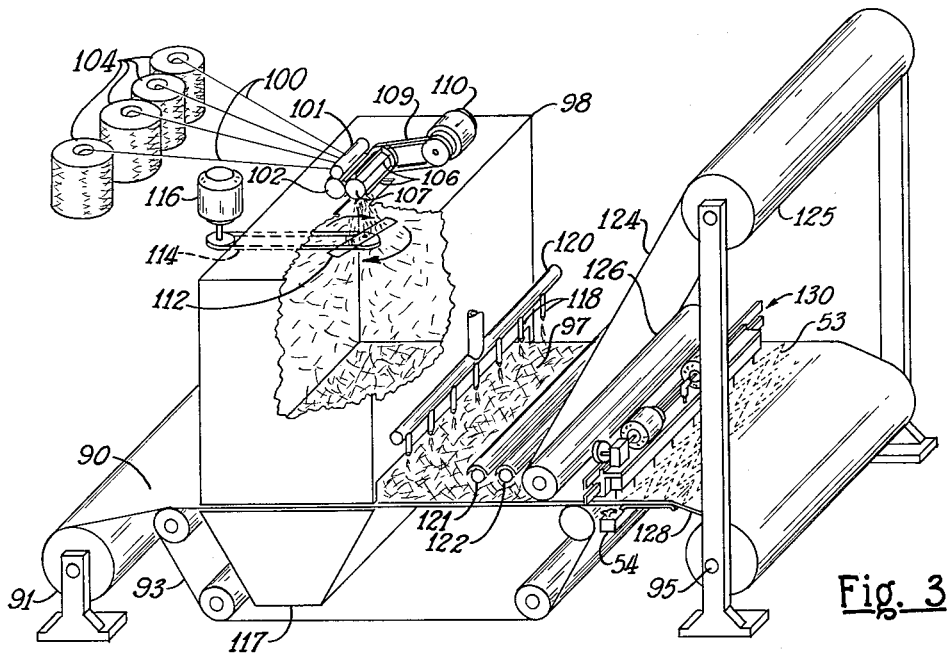
FIGURE 3 is a perspective view of other apparatus for producing still different reinforcing sheets of this invention.

In the schematic showing of FIGURE 3, apparatus is depicted for building a composite sheet in accordance with the invention in which a layer of short lengths of cut fibrous glass strands are collected and sandwiched between two bonded mats. The lower mat 90 is drawn from a supply roll 91 and carried upon belt conveyor 93 to the wind-up spindle 95. The pieces of cut strand 97 are formed and distributed over mat 90 within chamber 98.

As figuratively illustrated, continuous glass strands or rovings 100 are pulled by rollers 101 and 102 from spools 104. These strands are cut into short lengths by cutting blades 106 carried by drum 107 as the strands pass downwardly between rubber roller 102 and drum 107. Rotation of rollers 102 and 103 and of drum 107 is effected through a belt drive 109 from motor 110.

The falling pieces of strand are spread over the area of web 90 by the action of the revolving scatter blade 112 intercepting the downward gravitational travel of the decimated strand. The rotary movement of blade 112 is secured through belt 114 running from motor 116. The uniform distribution of the strand pieces upon the mat is assisted by air movement into suction hood 117.

To provide additional coherence to the deposited layer of cut strands a light impregnation of a binder is sprayed thereon through nozzles 118 extending from header 120. At least primary setting of the binder applied by nozzles 118 is secured by radiant heat from elements 121 and 122.

The top mat 124 from supply drum 125 is laid over the layer of cut strand by roller 126. The composite sheet 128 is then consolidated by the stitching mechanisms 130 and 54. The resulting product has the porosity, special strength and unity of the previously described sheets. It is also an advantageous form in that it may be made with greater bulk where desirable by increasing the quantity of cut strands in the center layer.

Figure 4:
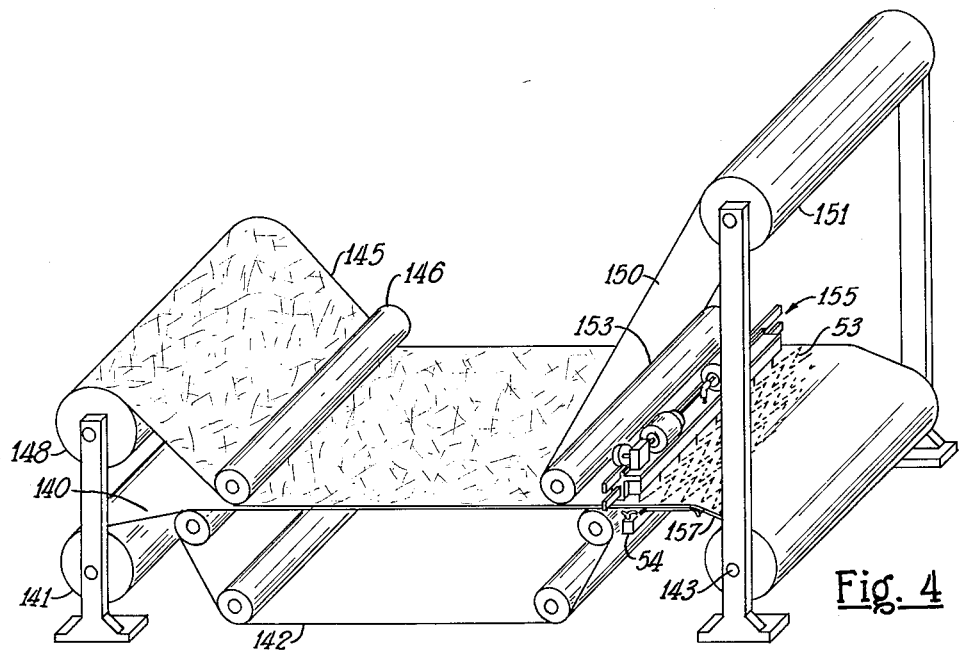
FIGURE 4 is a similar perspective illustration of apparatus for creating a further reinforcing element according to the invention.

In FIGURE 4 an apparatus is illustrated by which three webs of bonded chopped strands are joined together by the stitching operation into a composite sheet.

The bottom web 140 is drawn from supply roll 141 across conveyor 142 to the accumulator roll 143. The intermediate web 145 is laid thereon by roller 146 drawing this web from supply drum 148. The top web 150 arrives from drum 151 and superimposed over the preceding two webs by roller 153. Stitching mechanisms 155 and 54 tie the three plies of web together with continuous strands of fibrous glass.

The three layers of mat in the composite body 157 provide a more even distribution of the cut strands than would exist in a single mat built up to the same thickness due to variations in the deposit of the cut pieces in the forming operation. Two or a single mat may likewise be stitched with the continuous strands, rovings or yarns with equal gain in unification and strength due to the binding effect of the stitch and the courses of the stitching threads across and through the mat or mats.

Figure 5:
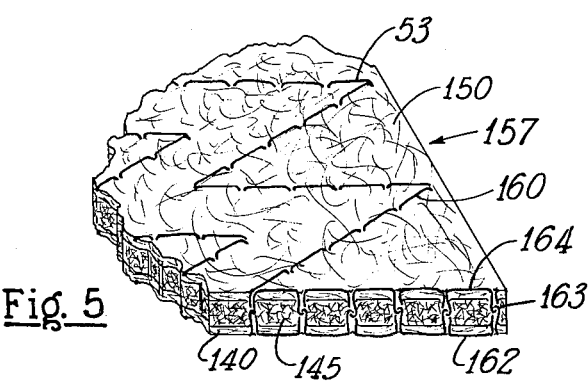
FIGURE 5 is a broken perspective view of a product of the apparatus of FIGURE 4.

An enlarged, partly broken, perspective view of the composite body 157 produced by the apparatus of FIGURE 4 is illustrated in FIGURE 5. As may be seen therein, an upper thread 160 composed of a glass strand is looped downward at regular intervals passing through upwardly extending loops of the lower thread 162. This interengagement 163 is a conventional lock stitch structure and serves to tie the mass together through its thickness. The straight stretches 164 of the strand threads between the loop engagements 163 hold the composite sheet across its greater planar dimensions as well as constituting in themselves strengthening elements in the function of reinforcing plastics. Increase in and closer spacing of the stitching amplifies these beneficial effects.

Figure 6:
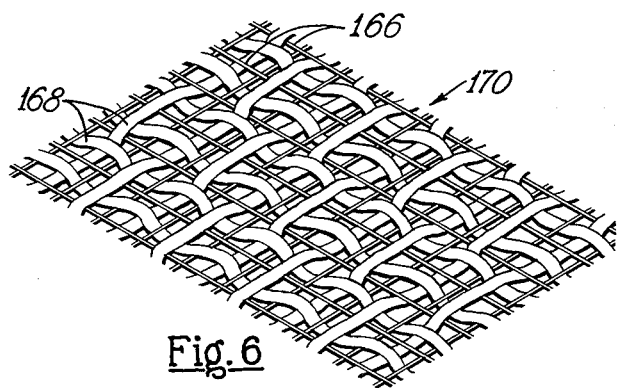
FIGURE 6 depicts, perspectively, a woven fabric embodying a supplemental variation of the inventive concept.

Another arrangement following the concept of the invention in utilizing a minor quantity of continuous strands to tie together major segments of unwoven fibrous elements is illustrated in FIGURE 6. As shown therein continuous strands 166 are interwoven with strips or tapes 168 of felted fibrous glass. The resulting sheet 170 has high strength due to the warp and fill courses of the continuous strands 166 while at the same time has the bulk and the porosity easing plastic flow provided by the unwoven strips or tapes 168.

As may be noted the various composite reinforcing sheets of this invention herein described have a predominant component of bonded or felted mat and a minor portion of continuous strand. Low cost, ease of plastic saturation, drapability and bulk are some of the benefits contributed by the inclusion of the mat, while dimensional integrity of the assembly, effective use of the inherent strength of the mat fibers, and added reinforcing power are contributed by the strand elements.

Less tailoring is required as the products conform more easily to the mold contours. Further, lay-up time is saved from the combination of fibrous glass material in the single package which may be substituted for several separate pieces which would have to be individually introduced and positioned within the mold.

The composite reinforcement of this invention may be secured at the edge of the mold and will not separate or stretch irregularly under the molding pressures as the strand stitching has a uniform transverse binding action. This is in contrast to the shifting and deterioration experienced with plain mats even when they are clamped in position. The spreading property of the composite sheets of this invention is permitted by the spacing of the stitching which is similar in effect to an open-mesh woven scrim.

Different characteristics, within a wide range, may be incorporated in the subject products as evidenced by the variation in properties of the five embodiments selected for disclosure.

The intermediate ply of whirled continuous strand 37 of the composite sheet 49 produced by the apparatus of FIGURE 1 adds to the uniformity in the distribution of fibrous glass in this composite product. The continuous strand form of this interlayer also increases the reinforcing value. These improved characteristics may be varied in extent by allowing more or less build-up of the curled strand material.

The parallel strand formation 70 sandwiched between the outer mat layers of the composite sheet 84 of FIGURE 2 contributes extra strength to this reinforcing media in the longitudinal direction in which the strands extend. This quality may be set at any desired degree by altering the size, spacing and number of strands. Strength cross-wise of the laminated product may likewise be amplified by insertions of a light web upon which parallel strands are adhered with the strands running between lateral edges of the web.

The composite sheet 128 produced by the apparatus of FIGURE 3 lends itself to inexpensive bulking through increase in the amount of the deposited cut strands. Also by directing more of the falling pieces of strand to certain areas a variation in thickness may be secured to better fit the requirements of certain molding operations.

In a similar manner the stitched mat product 157 of FIGURE 4 may be made with different thicknesses or bulk by varying the number of mats combined, and selected areas of the composite product may be increased in thickness by inserting a narrow mat strip along the center or by interposing a series of spaced mat sections.

The illustrations herein of stitching mechanisms are diagrammatic and should not be considered as representative of commercial machines which would be utilized in practicing this invention. Instead of a single linear battery of eight needle stations, as shown, a more conventional arrangement, particularly where a double-threaded lock stitch is utilized, would incorporate several staggered batteries with not more than three needle stations in each one. Installation, operation and servicing of such smaller units could be taken care of with reasonable ease. A single thread chain stitch would be equally as satisfactory as the illustrated lock stitch and would not involve the bobbins below the travelling web.

Where it is necessary to cut the reinforcing sheets of this invention into relatively small pieces to fit restricted mold areas, it may be desirable to first stitch along the line the cut will follow. This would curtail loosening of the main stitching at the border of the tailored piece and thus preserve its full reinforcing strength. However, this extra step adds cost to the operation and is not considered necessary in most instances.

Should binding together of the laminations of the subjects composite sheets be of prime interest and the final strength added by the stitching strands per se considered unimportant, nylon or other organic strands or yarns may be substituted for the glass strands prescribed herein. The organic strands have greater elasticity than those of glass filaments and therefore do not resist forces applied to the plastic articles in which they have been incorporated as readily as do those of glass. The organic strands may also be subject to dissolving or chemical action by the plastic resin.

The advantage of combining several layers of reinforcing elements in one unit as provided by this invention may of course be extended to the inclusion of woven fabrics as well as the unwoven mats featured herein. With a woven cloth as the intermediate layer there would be a gain in strength, but also a loss in other qualities such as stretchability and ease of plastic flow.

The term "strand" as used in the accompanying claims should be interpreted sufficiently broadly to encompass strands twisted and plied as rovings, yarns and cords.

By "straight courses of strands," as employed in the claims, it is intended to refer to the straight stretches fibrous glass strands extending between the points where the strands extend down through the sheet-like body and are connected to strands situated upon the opposite side of the body.

While specific combinations of fibrous webs have been described the utility of the invention would be effective in connection with the coupling together of other types of fibrous glass sheets or mats.

Additional substitutions and modifications may, of course, be made in the composite sheets of this invention without departing from the spirit thereof or going beyond the scope of the appended claims.

We claim:

1. An air permeable fibrous glass body for inclusion as reinforcement in molded or laminated plastic products having unwoven webs of bonded glass fibers on opposite surfaces, an intermediate, unbonded layer of continuous glass fiber strands, and spaced stitching of continuous glass fiber strands between the unwoven webs and through the intermediate, unbonded layer to hold the webs and layer in assembled relation.

2. An air permeable fibrous glass body according to claim 1 in which the bonded glass fibers of the unwoven webs are in the form of chopped strands.

3. An air permeable fibrous glass body according to claim 1 in which the continuous glass fiber strands of the intermediate layer are arranged in overlapping whirls.

4. An air permeable fibrous glass body for inclusion as reinforcement in molded or laminated plastic products including unwoven, bonded, fibrous glass webs on opposite sides of the body, other fibrous glass elements of continuous strand form interposed between the webs, and continuous strands of fibrous glass extending over the outer surfaces of the webs, said strands being periodically joined together through the body to hold the webs and the interposed fibrous glass elements in assembled relation.

5. An air permeable fibrous glass body according to claim 4 in which the fibrous glass elements of continuous strand form interposed between the webs are arranged in parallel formation.

References Cited in the file of this patent
UNITED STATES PATENTS

| | | |
|---|---|---|
| 108,821 | Peple | Nov. 1, 1870 |
| 808,792 | Warren et al. | Jan. 2, 1906 |
| 970,971 | Thompson | Sept. 20, 1910 |
| 2,141,386 | Habib | Dec. 27, 1938 |
| 2,391,674 | Brown et al. | Dec. 25, 1945 |
| 2,748,448 | Menzies et al. | June 5, 1956 |
| 2,768,420 | Runton | Oct. 30, 1956 |
| 2,794,237 | Dildilian et al. | June 4, 1957 |
| 2,861,600 | Lawton | Nov. 25, 1958 |
| 2,875,503 | Frickert et al. | Mar. 3, 1959 |
| 2,884,681 | Labino | May 5, 1959 |